US008517304B2

(12) United States Patent
Journade et al.

(10) Patent No.: US 8,517,304 B2
(45) Date of Patent: Aug. 27, 2013

(54) DEVICE FOR LOCKING AN ENGINE ON AN AIRCRAFT PYLON

(75) Inventors: Frédéric Journade, Toulouse (FR); Esteban Quiroz-Hernandez, Toulouse (FR); Jean-Michel Saucray, Villeneuve les Bouloc (FR)

(73) Assignee: Airbus Operations S.A.S., Toulouse (FR)

( * ) Notice: Subject to any disclaimer, the term of this patent is extended or adjusted under 35 U.S.C. 154(b) by 397 days.

(21) Appl. No.: 12/894,726

(22) Filed: Sep. 30, 2010

(65) Prior Publication Data
US 2011/0079679 A1    Apr. 7, 2011

(30) Foreign Application Priority Data
Oct. 1, 2009   (FR) ..................................... 09 56867

(51) Int. Cl.
*B64D 27/26*   (2006.01)

(52) U.S. Cl.
USPC ................................ 244/54; 248/554; 60/796

(58) Field of Classification Search
USPC .............. 244/54, 55; 248/554–557; 60/796, 60/797
See application file for complete search history.

(56) References Cited

U.S. PATENT DOCUMENTS

| 4,428,189 | A | 1/1984 | Greenberg et al. |
| 5,028,001 | A | 7/1991 | Bender et al. |
| 5,443,229 | A | 8/1995 | O'Brien et al. |
| 5,806,792 | A | 9/1998 | Brossier et al. |
| 6,935,591 | B2 * | 8/2005 | Udall ............................... 244/54 |
| 7,121,504 | B2 * | 10/2006 | Machado et al. ............... 244/54 |
| 7,232,091 | B2 * | 6/2007 | Marche ........................... 244/54 |
| 7,296,768 | B2 * | 11/2007 | Machado et al. ............... 244/54 |
| 7,350,747 | B2 * | 4/2008 | Machado et al. ............... 244/54 |
| 7,971,825 | B2 * | 7/2011 | Diochon et al. ................. 244/54 |

(Continued)

FOREIGN PATENT DOCUMENTS

| EP | 0 761 945 A1 | 3/1997 |
| EP | 1 902 951 A1 | 3/2008 |

(Continued)

OTHER PUBLICATIONS

Preliminary Search Report issued May 5, 2010 in FA 726541 FR 0956867 (with Translation of Category of Cited Documents).

(Continued)

*Primary Examiner* — Joseph W Sanderson
(74) *Attorney, Agent, or Firm* — Oblon, Spivak, McClelland, Maier & Neustadt, L.L.P.

(57) ABSTRACT

A device for locking an engine on a pylon includes two systems attaching the engine to the pylon, located in attachment regions spaced out in a longitudinal direction of the engine. A second region is adjacent to a center of gravity plane of the engine and closer to a fan than a first region. A first system attaching to the first region is rigid towards torsional, transverse and vertical engine forces. The first region is located at a separation between two compressors of the engine or two turbines, whether the fan is at a rear or front of the engine respectively, the separation being adjacent to a node of a first engine flexural mode. A second system attaching to the second region is rigid towards transverse and vertical forces but less rigid than the first system. The device also includes a third system withstanding thrust forces in the longitudinal direction.

9 Claims, 3 Drawing Sheets

(56) References Cited

U.S. PATENT DOCUMENTS

| | | | |
|---|---|---|---|
| 8,042,342 B2 * | 10/2011 | Diochon et al. | 60/797 |
| 2004/0245383 A1 * | 12/2004 | Udall | 244/54 |
| 2005/0151008 A1 * | 7/2005 | Machado et al. | 244/54 |
| 2005/0178888 A1 * | 8/2005 | Machado et al. | 244/54 |
| 2005/0178889 A1 * | 8/2005 | Machado et al. | 244/54 |
| 2008/0191088 A1 * | 8/2008 | Diochon et al. | 244/54 |
| 2008/0210811 A1 * | 9/2008 | Diochon et al. | 244/54 |
| 2008/0216483 A1 * | 9/2008 | Diochon et al. | 60/796 |
| 2009/0134271 A1 * | 5/2009 | Baillard et al. | 244/54 |
| 2012/0168558 A1 * | 7/2012 | Journade et al. | 244/54 |
| 2012/0175462 A1 * | 7/2012 | Journade et al. | 244/54 |

FOREIGN PATENT DOCUMENTS

| | | |
|---|---|---|
| FR | 2 873 987 A1 | 2/2006 |
| FR | 2 900 907 A1 | 11/2007 |
| FR | 2 907 098 A1 | 4/2008 |
| FR | 2 913 664 A1 | 9/2008 |
| FR | 2 928 347 A1 | 9/2009 |
| WO | WO 2008/000924 A1 | 1/2008 |

OTHER PUBLICATIONS

International Search Report issued Nov. 18, 2010 in PCT/FR2010/051950 (with Translation of Category of Cited Documents).

International Search Report issued Nov. 18, 2010 in PCT/FR2010/051949 (with Translation of Category of Cited Documents).

* cited by examiner

DEVICE FOR LOCKING AN ENGINE ON AN AIRCRAFT PYLON

BACKGROUND OF THE INVENTION

I. Field of the Invention

The subject of this invention is a device for locking an engine on an aircraft pylon.

II. Description of Related Art

Engines of aircraft are suspended from the latter with pylons, and the junction between the engines and the pylons is accomplished by attachment systems which may comprise various mechanical components. A typical design comprises two attachment systems placed at two different planes of the engine for supporting it in a stable way. In a customary achievement of this design, which may be encountered with double flow engines with an either ducted fan or not (propfans), the rear attachment region is located (in the case of a "thruster" engine where the fan is placed at the rear) at the connection between the turbines and the fan, not far from the center of gravity of the engine, which provides the advantage of better transmission of the thrust forces to the pylon and to the aircraft, while the front attachment region is located at the very front of the engine, in front of the compressors, so that the large distance between the regions imparts greater stability to the locking.

It turned out that this design could be improved in order to reduce the level of the vibrations transmitted to the aircraft by the engine. The improvement represented by the invention was focused on two points: the position of the attachment systems of the engine and the distribution of their rigidity characteristics.

BRIEF SUMMARY OF THE INVENTION

An origin of the invention is the observation that the first vibratory flexural mode of many engines comprises a front vibration mode close to a region of separation between two compressors, one at a lower pressure and the other one at a higher pressure: it was therefore decided to place the front attachment system at this location so that the vibrations of this first flexural mode of the engine, which are involved to a large extent in the total level of the vibrations, are therefore very weakly experienced by the front attachment system and therefore are very little transmitted to the aircraft. The rear vibration node of this mode is generally at the rear of the engine, close to the propellers of the fan in the case of a "propfan", i.e. it is not very far from the customary rear attachment region but it is all the same distinct from it. As this attachment region is advantageous per se, since the locking of the engine by the center of gravity reduces the flexural deformations which it undergoes, which cause performance losses and wear, its location is not modified according to the invention, but it was decided to make the rear attachment system more flexible than the front attachment system in order to exert filtering of the vibrations which it transmits because the rear vibration mode does not coincide with the rear attachment plane.

To summarize, the invention relates to a device for locking an engine on an aircraft pylon, comprising two systems for attaching the engine to the pylon located in attachment regions spaced out in the longitudinal direction of the engine and of the aircraft, including a first front region and a second region placed close to a plane of the center of gravity of the engine, and closer to a fan than the first region, characterized in that the system for attachment to the first region is rigid towards torsional, transverse and vertical forces exerted by the engine, the first region is located at the location of a separation either between two compressors of the engine or two turbines depending on whether the fan is at the rear or at the front of the engine respectively, said separation being close to a node of a first flexural mode of the engine, and in that the system for attachment to the second region is rigid towards transverse and vertical forces but less rigid than the system for attachment to the first region, and the device comprises means withstanding thrust forces in the longitudinal direction.

In the sense of the invention, the term "rigid" is applied to a mechanical connection which can only be deformed by a small amount or a negligible amount and with a significant force, "more rigid" than another one, a mechanical connection which is deformed by a smaller amount than the other one by applying a same force, and "flexible", a mechanical connection which may be deformed by a large amount with a weak or negligible force. As a first approximation (all the mechanical connections in reality being intermediate between complete rigidity and complete flexibility), the flexible connections will be freely deformable and the rigid connections non-deformable. The person skilled in the art of aeronautics is aware of the connections in his field which may be considered as flexible or rigid.

The locking device may further comprise a system of connecting rods withstanding thrust forces. If these different arrangements coexist, the whole of the attachment systems is designed in order to remove six degrees of freedom between the engine and the pylon, with an arrangement which authorizes isostatic mounting and thereby avoids transmitting significant forces from the internal assembling stresses.

Good characteristics for transmitting the forces from the engine to the pylon may be obtained when the connecting rod runs down from the pylon to the engine from a location close to the front region to a location close to the rear region and is directed towards a point of intersection between the engine axis and the rear attachment plane.

Two different ways are contemplated for ensuring a more flexible attachment system of the rear region than the front attachment system: i.e. the use of flexible connections, known to the person skilled in the art, in the rear attachment system; or the design of the pylon with a portion for connecting to the rear attachment system built in a more flexible structure than a main portion of the pylon.

The invention further relates to an aircraft provided with such a locking device.

BRIEF DESCRIPTION OF THE DRAWINGS

It will now be described in its different aspects and with more details in connection with the following appended figures.

DETAILED DESCRIPTION OF THE INVENTION

Figure 1:
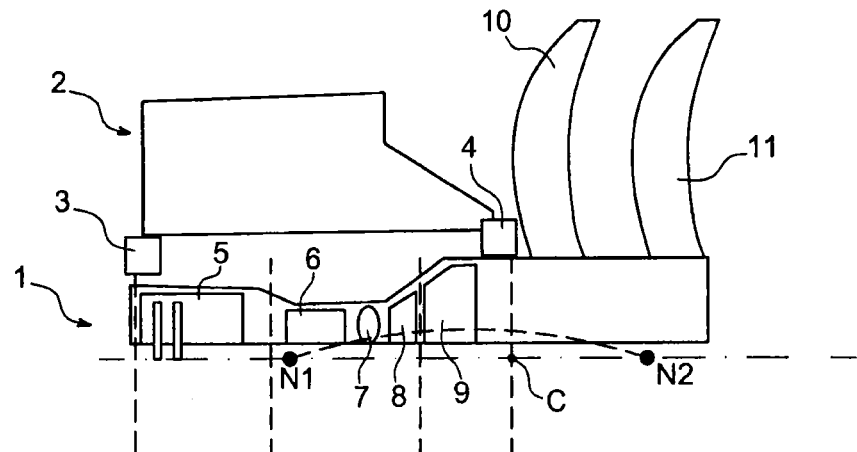
FIG. 1 illustrates a prior design of a locking device.

A traditional design is illustrated in FIG. 1. An engine 1 is suspended from a pylon 2 by means of a front region attachment system (which will be abbreviated as "front attachment system") 3 and of a rear region attachment system ("rear attachment system") 4. The front attachment system 3 is at the very front of the engine, and in front of the low pressure compressor 5, after which are conventionally found a high pressure compressor 6, a combustion chamber 7, a high pressure turbine 8, a low pressure turbine 9 and further two propellers 10 and 11 of a non-ducted fan. The rear attachment system 4 is placed between the low pressure turbine 9 and the front propeller 10, not far from the plane of the center of gravity C of the engine 1.

Figure 2:
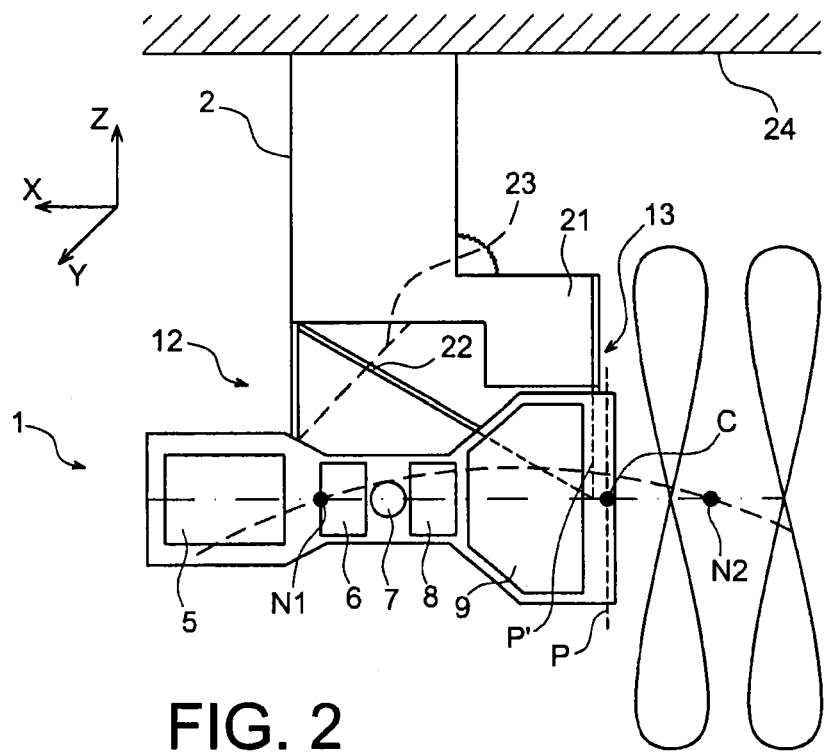
FIGS. 2 and 4 illustrate an embodiment of the invention.

Now, a first embodiment is illustrated in FIG. 2. As this has been mentioned, the first flexural vibration engine mode of the engine 1 comprises two nodes $N_1$ and $N_2$ placed approximately between the compressors 5 and 6 for the first and in the propellers 10 and 11 for the second. The front attachment system, now 12, extends between the pylon 2 and a portion of the engine 1 comprised between the compressors 5 and 6, as close as possible to the first node $N_1$ since the attachment systems have to be established at the separations between the main components of the engine 1, where large stiffening structures are found for supporting the bearings of shaft lines. The rear attachment system 13 is left between the low pressure turbine 9 and the propellers 10 and 11, not far from the transverse plane P containing the center of gravity C of the engine 1.

Figure 3:
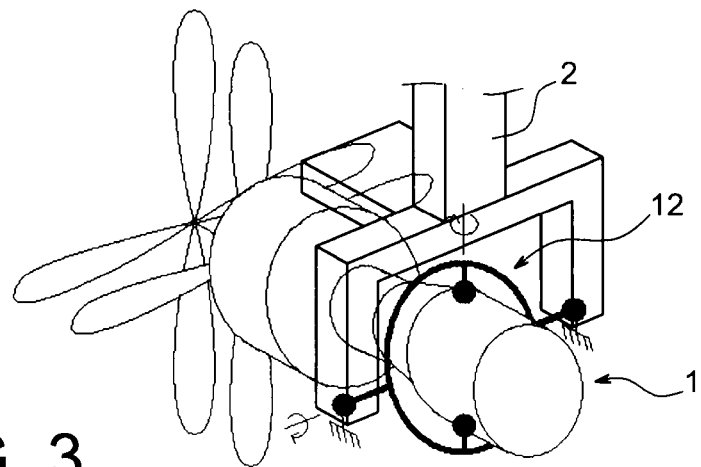
FIG. 3 illustrates the sought functional kinematics.

The front 12 and rear 13 attachment systems may be built by means of customary mechanical components such as connecting rods, but the invention does not deal with building details of technological nature of the attachments but with their arrangements and their general properties. It is in this way that the front attachment system 12 may be built so as to transmit, while being rigid towards them, the transverse Y forces, the vertical Z forces, and the torques $M_x$ of the engine 1 around the longitudinal direction X. This junction tries to reproduce kinematics similar to a universal joint as illustrated in FIG. 3. The front attachment system 12 may be flexible towards the other forces which are applied to it.

The rear attachment system 13, illustrated in FIG. 2, is built by means of customary mechanical components such as connecting rods. This attachment system may be built so as to take up the transverse Y and vertical Z forces while being rigid towards them. Larger flexibility is however recommended for the rear attachment system, which may be achieved if the (moreover essentially vertical) pylon 2 has a rear portion 21 cantilevered from the remainder of the pylon and built to be more flexible than the remainder of the pylon, to the end of which the attachment system 13 is connected. The desired locking flexibility is then shared by the attachment system 13 and the portion 21 of the pylon 2. The rear portion 21 has the ability of bending when forces are applied to it, which contributes to limiting the extent of the vibrations transmitted to the pylon 2. In an equivalent design, illustrated in FIG. 4, the attachment 13 is replaced with flexible connections 30 for flexibly taking up the same Y and Z forces.

Referring back to FIG. 2, it is seen that the locking device is completed by an oblique connecting rod 22 extending between the pylon 2 and the engine 1 and intended to transmit thrust forces. This connecting rod may be placed in the illustrated way, oblique and running down rearwards, connected to the pylon 2 close to the front attachment system 12 and extending towards the intersection of a plane P' of the rear attachment system 13 and of the axis of the engine in order to transmit a pure compressive force to the pylon 2. A different design, for example running down forwards, as illustrated by reference 23, may however be adopted.

Figure 4:
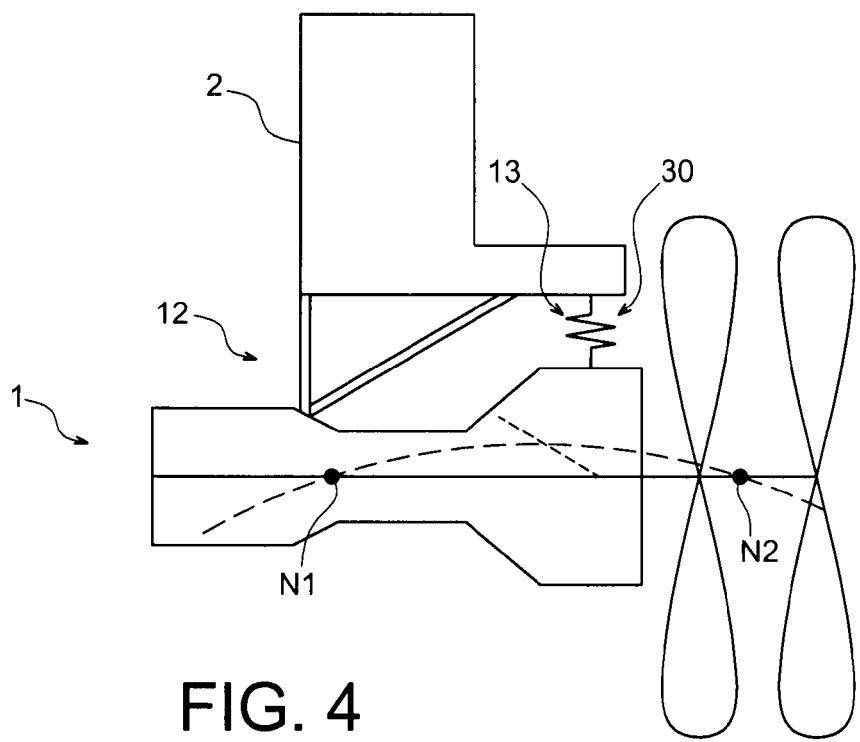

The attachment structure of the engine illustrated in FIGS. 2, 3, and 4 therefore essentially blocks six degrees of freedom: two Y translations, two Z translations, one X translation and one rotation around X. As the two blocked Y translations and the two blocked Z translations are equivalent to rotations around Z and Y respectively, it may be considered that the six fundamental degrees of freedom of the engine 1 are each blocked once, and therefore the attachment structure is isotatic. The pylon 2 may equally be locked to the aircraft 24 partly illustrated by its fuselage or by a wing.

Certain ancillary advantages of the invention are that the pylon 2 is narrower in the longitudinal direction X, which may allow it to be lightened and make available a space above the front of the engine 1 for installing another piece of equipment therein; and that disk shots, consecutive to partial breakage of a component of the rotor of the engine 1 during an accident and which would have the effect of breaking the structures on the trajectory of this component provided with very large kinetic energy, are less dangerous here since the risk is smaller for them to appear between the attachment regions 12 and 13, closer to each other than customarily, where they are most feared since they may then cut the pylon 2 in two so that one of the attachment systems 12 and 13 would no longer be connected to the aircraft 24 and that falling of the engine 1 would become possible.

Figure 5:
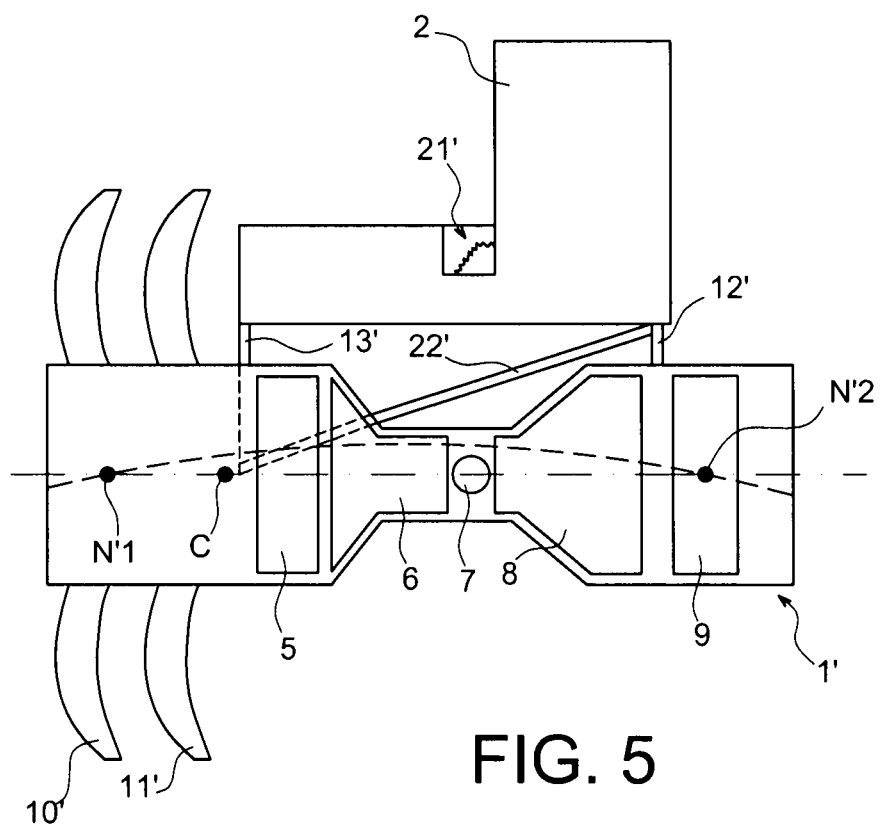
FIGS. 5 and 6 illustrate the achievement of two embodiments of the invention on another engine.

Another type of embodiment of the invention will now be described: the focus up to now has been on so-called "thruster" engines for which the fan is at the rear; now there exist other engines comprising the same components, but "towed" engines, the fan of which is at the front. An example is schematically described in FIG. 5: from front to rear are found the propellers 10' and 11', followed by the compressors 5 and 6, the combustion chamber 7, and the turbines 8 and 9. The preceding considerations apply symmetrically here since the nodes $N_1$ and $N_2$ of the first node of flexural vibrations customarily extend to the location of the propellers 10' and 11' for one of them and close to the place of separation between the turbines 8 and 9 for the other one.

Figure 6:
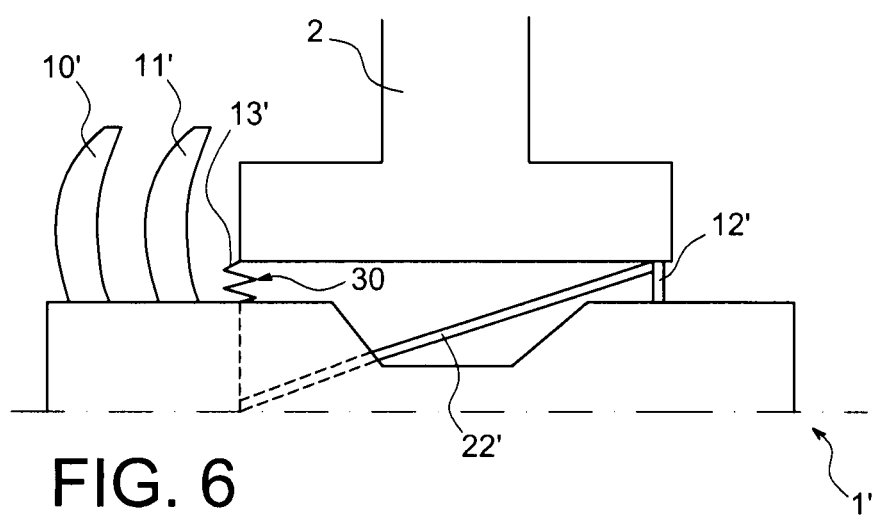

Having a rear attachment system 12' at the location of this place of separation between the turbines 8 et 9, and having the front attachment system 13' near the plane of the center of gravity C', between the propellers 10' and 11' on the one hand, the low pressure compressor 5 on the other hand, is therefore compliant with this aspect of the invention. Further, the connection between the engine 1' and the pylon 2 is more flexible with the front attachment system 13' than with the rear attachment system 12'. This may be accomplished by a flexible attachment portion 21' of the pylon 2 near the front attachment system 13' or by building the front attachment system 13' in the form of flexible connections 30, as illustrated in FIG. 6. The most favorable arrangement of the thrust rod 22', when the invention includes one of them, is by analogy between the rear of the pylon 2, close to the rear attachment system 12' and a foremost connection to the engine 1', in the direction of an intersection between its axis and a plane of the front attachment system 13'.

Reversing the order of the propellers on the engine, therefore results in a reversal of the order of the attachment regions in both kinds of engines, since these regions are selected according to the positions of the vibration nodes and of the center of gravity; now it is noticed that these positions are approximately the same relatively to the fan in each of these kinds of engines; all the considerations, features and all the provided advantages concerning the thruster engine remain valid and are applicable here, the most flexible attachment system being the one which is closest to the fan, and the compressors and turbines being reversed relatively to the fan in the case of a towed engine.

The preceding description will therefore not be entirely repeated here.

The invention claimed is:

1. A device for locking an engine on an aircraft pylon, comprising:

two systems that attach the engine to the pylon, located in attachment regions spaced out in a longitudinal direction of the engine and of the aircraft, the attachment regions including a first front region and a second region, the second region placed adjacent to a plane of a center of gravity of the engine and closer to a fan than the first region, wherein a first system of the two systems that attaches to the first region is rigid towards torsional, transverse and vertical forces exerted by the engine, the first region is located at a location of a separation between two compressors of the engine or two turbines depending on whether the fan is at a rear or at a front of the engine respectively, said separation being adjacent to a node of a first engine flexural mode, and a second system of the two systems that attaches to the second region is rigid towards transverse and vertical forces but less rigid than the first system that attaches to the first region, and the device comprises a third system that withstands thrust forces in the longitudinal direction.

2. The locking device according to claim 1, wherein the second region is located between the turbines or the compressors of the engine and the fan, depending on whether the fan is at the rear or at the front of the engine respectively.

3. The locking device according to claim 1, wherein the third system that withstands the thrust forces comprises a connecting rod connecting the pylon to the engine.

4. The locking device according to claim 3, wherein the connecting rod runs down from the pylon to the engine from a location adjacent to the first region to a location adjacent to the second region and is directed towards an intersection between the axis of the engine and a plane of the second region.

5. The locking device according to claim 1, wherein the second system that attaches to the second region comprises flexible connections.

6. The locking device according to claim 1, wherein the pylon comprises a portion that connects to the second system that attaches to the second region which is more flexible than a main portion of the pylon, to which the first system that attaches to the first region is joined.

7. The locking device according to claim 1, wherein the locking device is isostatic.

8. An aircraft, wherein the aircraft comprises a locking device according to any of the preceding claims.

9. A device for locking an engine on an aircraft pylon, comprising:

two means for attaching the engine to the pylon, located in attachment regions spaced out in a longitudinal direction of the engine and of the aircraft, the attachment regions including a first front region and a second region, the second region placed adjacent to a plane of a center of gravity of the engine and closer to a fan than the first region, wherein a first means for attaching to the first region, of the two means, is rigid towards torsional, transverse and vertical forces exerted by the engine, the first region is located at a location of a separation between two compressors of the engine or two turbines depending on whether the fan is at a rear or at a front of the engine respectively, said separation being adjacent to a node of a first engine flexural mode, and a second means for attaching to the second region, of the two means, is rigid towards transverse and vertical forces but less rigid than the first means for attaching to the first region, and the device comprises a means for withstanding thrust forces in the longitudinal direction.

\* \* \* \* \*